F. L. SHELOR.
APPARATUS FOR FILLING RECEPTACLES.
APPLICATION FILED JUNE 6, 1918.
1,437,917.
Patented Dec. 5, 1922.
2 SHEETS—SHEET 1.
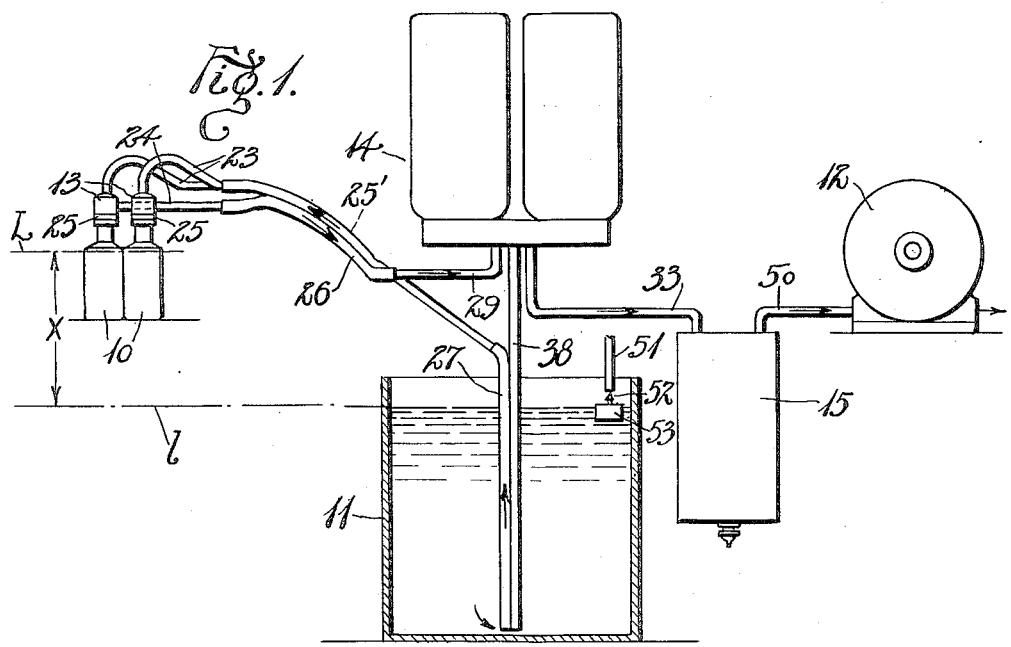
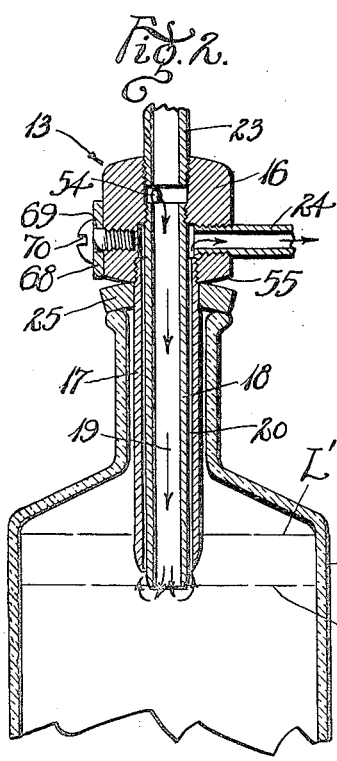
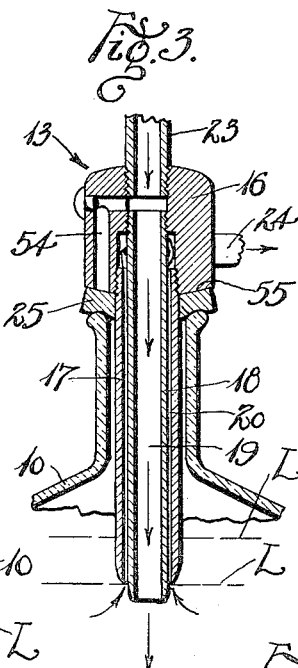
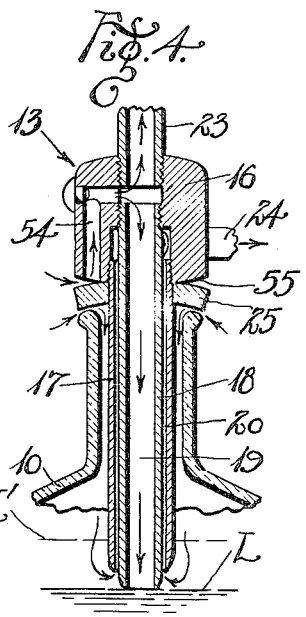
INVENTOR.
Frederick L. Shelor,
BY
Monroe F. Miller
ATTORNEY.

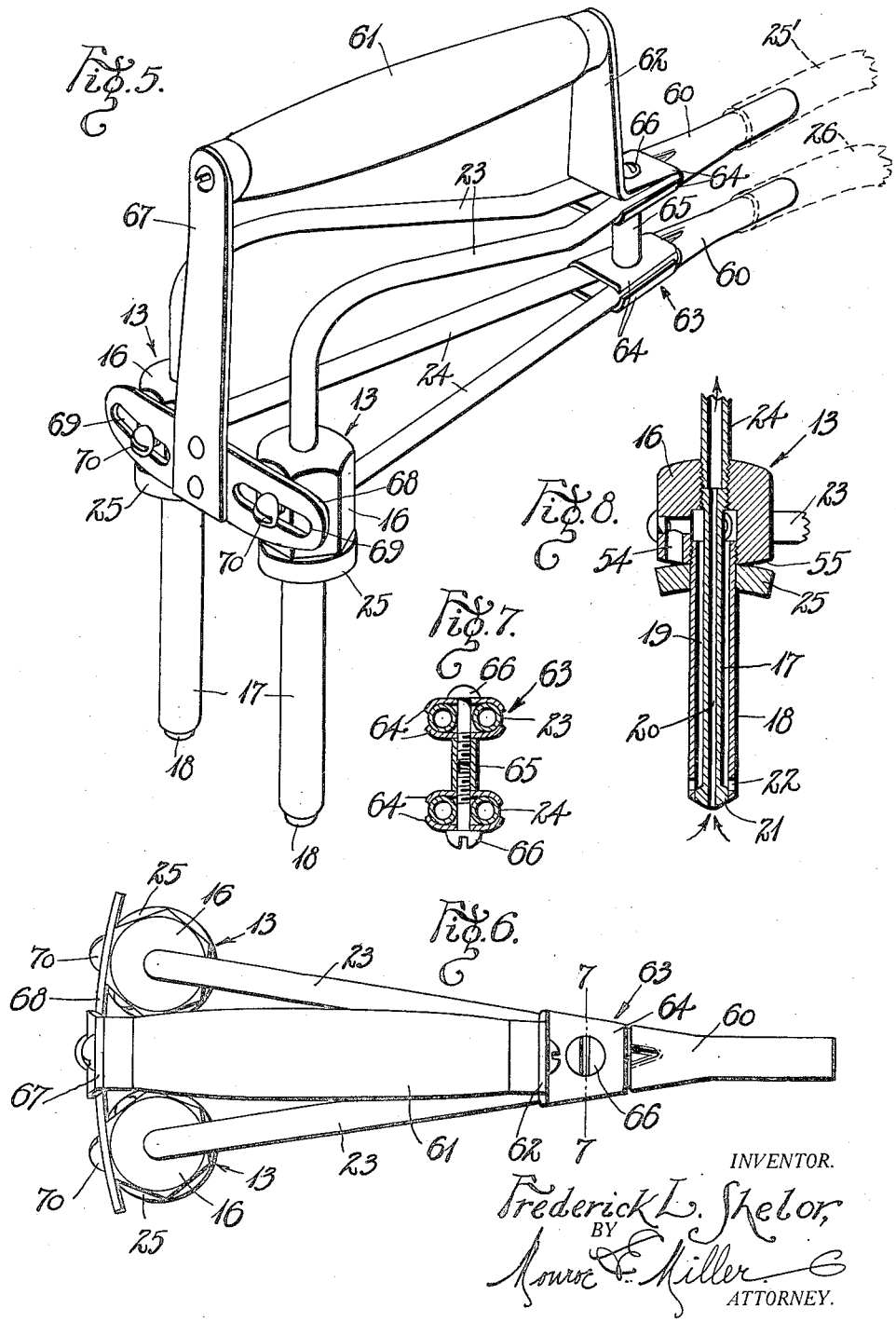

Patented Dec. 5, 1922.

1,437,917

UNITED STATES PATENT OFFICE.

FREDERICK L. SHELOR, OF SALEM, VIRGINIA, ASSIGNOR TO INTERNATIONAL FILLER CORPORATION, OF PETERSBURG, VIRGINIA, A CORPORATION OF VIRGINIA.

APPARATUS FOR FILLING RECEPTACLES.

Application filed June 6, 1918. Serial No. 238,503.

*To all whom it may concern:*

Be it known that I, FREDERICK L. SHELOR, a citizen of the United States, and resident of Salem, in the county of Roanoke and State of Virginia, have invented certain new and useful Improvements in an Apparatus for Filling Vessels, of which the following is a specification.

The present invention relates to the art of packaging liquids, and embodies variations and improvements in the method and apparatus over those disclosed in my co-pending application Serial No. 226,808, filed April 5, 1918.

It is an object of the invention to provide a novel apparatus for filling bottles or other vessels with liquid in a rapid, convenient and efficacious manner by the aid of air suction, whereby to effect a saving in time, labor and expense and obtain other advantages as set forth in said application, provision being made whereby the flow of air and liquid are established and terminated in such a way that further benefits are derived.

An important feature of the invention is the provision preferably in the liquid conduit or passage, of a port for the inflow of air from the atmosphere excepting when the apparatus and vessel are completely brought together for filling, in order that such port will modify the method and apparatus as over those shown in said application, to gain additional points of utility. One of these is the fact that this port lets air flow into the liquid conduit or siphon when the apparatus and vessel are being separated, so that the liquid in said conduit below said port, or between it and the vessel, will flow into the vessel, whereas the liquid above said port, or between it and the reservoir from which the liquid is taken, can flow back or reverse to avoid overflow in an effective manner. Another advantage gained by using said port is that it provides means for establishing and stopping the flow of liquid into the vessel dependent on the closure of said port when the vessel is sealed by the application of the vessel and apparatus one to the other, as contradistinguished from the method and apparatus disclosed in said application, wherein the sealing and unsealing of the vessel alone starts and stops the flow of liquid. With the present arrangement, the vessel can first be sealed and the port then closed to establish the liquid flow, and when the vessel is filled and the apparatus removed, said port is first opened and the vessel then unsealed for the drainage of the liquid below said port into the vessel to complete the filling thereof and to avoid dripping, spilling or other waste of the liquid when changing from filled to unfilled vessels.

Another object of the invention is the provision of a novel and improved hand device for the manipulation of the filler heads, having improved features of construction to enhance its utility and efficiency.

With the foregoing and other objects in view, which will be apparent as the invention is better understood, the invention resides in the apparatus hereinafter described, it being understood that changes within the scope of what is claimed can be made without departing from the spirit of the invention.

The invention is illustrated in the accompanying drawings, wherein—

Figure 1 is a diagrammatical view of the apparatus.

Figure 2 is a vertical section of a filler head as applied to a vessel but not completely pressed into place, the arrows indicating the flow of air in this position of the filler head with respect to the vessel.

Figure 3 is a vertical section of the filler head, the plane of section being at an angle to that of Figure 2 and the filler head being in filling position.

Figure 4 is a view similar to Figure 3 showing the filler head lifted to unseal both the port and vessel, the arrows showing how the air enters.

Figure 5 is a perspective view of the hand filler head device.

Figure 6 is a plan view of said device.

Figure 7 is a cross section on the line 7—7 of Figure 6.

Figure 8 is a vertical section of a modified form of filler head.

The method and apparatus resemble, in general respects, those disclosed in said application, but there are variations as hereinafter set forth to accomplish certain modified functions. The numerals 10 designate the bottles or vessels to be filled (two being filled at a time with the apparatus as shown), and the supply of liquid is contained in a suitable reservoir 11 located at a lower level than the vessels.

The filling of the vessels is accomplished through the aid of a suction or exhaust pump 12 or other equivalent means, which serves to draw the air from the vessels by the aid of filler heads 13 applied thereto. As disclosed in said application, an overflow receiver 14 and reclaiming device 15 are interposed between said filler heads and pump, and since said devices are fully disclosed in said application, they need no detailed disclosure herein. The function of the overflow receiver 14 is to catch the overflow liquid drawn from the vessels and to return it through a drain pipe 38 to the reservoir 11, while the reclaiming device 15 collects the vapor taken from the vessels, so that it can be reclaimed. A pipe 33 connects the receiver 14 and device 15 and said device is in turn connected to the pump 12 by a pipe 50. The air and liquid enter the receiver 14 through a pipe 29 communicating with the filler heads. The level $l$ of the liquid in the reservoir 11 is maintained constant when essential. As shown, this is accomplished by supplying the liquid into the said reservoir through a pipe 51, the flow being established and cut off by means of a valve 52 operated by a float 53, as will be readily understood.

Each of the filler heads, of which there may be any suitable number according to the number of vessels it is desired to fill simultaneously, is similar in construction to those disclosed in said application with improved features. Each of the filler heads 13 as shown includes a block or member 16, a depending tubular stem or nipple 17 having its upper end threaded or otherwise engaged with said member 16, and a second tubular stem or nipple 18 within the stem 17 and also having its upper end threaded or otherwise engaged within the member 16.

Between the outer and inner stems 17 and 18, respectively, is an eduction passage or channel 20, while the bore of the inner stem 18 provides a liquid entry passage or channel 19, the passage 20 being of restricted cross sectional area to impede the flow of liquid therethrough, whereas the passage 19 is of considerably larger capacity or cross sectional area, according to the disclosure of said application, and the advantages of which need not be reiterated. Tubes or pipes 23 and 24 are connected to each member 16 in communication with the upper ends of the respective stems 18 and 17, and a rubber or other suitable gasket 25 is fitted on the stem 17 immediately below or next to the member 16 to seat on and seal the mouth of the vessel into which the stems are thrust. All of the tubes 23 of the several filler heads communicate with the supply reservoir 11, and as shown, are connected to a common supply tube or hose 25' (preferably flexible when the filler heads are manipulated by hand, to permit freedom of movement), which connects with a pipe or tube 27 dipping in the liquid in the reservoir. The tubes 24 are all connected to the exhaust pump 12, said tubes having connection with a common tube or hose 26 similar to the hose 25' and leading to the pipe 29.

The apparatus as so far described is substantially the same as that disclosed in said application, and the variations and improvements will be described presently.

In carrying out this invention, the liquid conduit comprising the stem 18, and tube 23 of each filler head, hose 25' and pipe 27, and which forms a liquid siphon having its long leg entering into the reservoir and its short leg arranged to open into the vessel. The filler head is provided with an air inlet port 54. As shown, this port 54 is in the member 16 of each filler head and opens into the short leg of said conduit near the highest point, and said port 54 is illustrated as opening to the atmosphere at the bottom or lower surface of the member 16 and as opening into the short leg of the siphon conduit between the adjacent ends of the tube 23 and stem 18. By means of this port 54, air can enter the liquid conduit at the upper end of the stem 18 thereof, in order to separate or divide the liquid stream between its ends. The gasket or seal 25 also serves to close or seal the port 54 in addition to sealing the mouth of the vessel when the filler head is applied. The arrangement is such that when the filler head and vessel are brought together, the seal first closes the vessel, and then closes the air entry port 54. Thus, as shown, the bottom or lower surface of the filler head member 16 is convexed, and the seal 25 is reversely convexed, although either said surface or seal can be flat while the other is convexed, in order that the seal will spring away from the port 54 when pressure is relieved, but when the seal is applied to the vessel and the filler head pressed into place, the filler head member 16 and seal 25 will be pressed together to close the port 54 and prevent the inflow of air therethrough.

*Operation.*

During the filling process, the pump 12 is kept in operation constantly, so as to produce a constant flow through the air conduit from the filler heads, and it is the operator's duty to apply the filler heads to the vessels and hold them applied until the vessels are filled, and then to change to the next vessels, thereby enabling unskilled labor to fill the vessels with great speed and little or no training.

The first step is to insert the stems of the filler heads into the empty vessels, and seat the seals 25 on the mouths thereof, or the vessels can be applied to the filler heads with the same results although possibly not the same speed because the filler heads are easier to move about. Before the seals 25 seat on the vessels, air flows from the atmosphere into the air conduit, and when the seals are seated on the vessels, air can no longer enter the mouths of the vessels, but can enter through the ports 54 and stems 18 to then pass into the air conduit. This entry of air, as indicated by arrows in Figure 2, is only momentary, and as soon as the filler heads are pressed against the bottles, the members 16 and seals 25 come together, as shown in Figure 3, to close the ports 54 which starts the flow of liquid. It is the sealing of the ports 54, therefore, that starts the liquid flow, instead of the sealing of the vessels as disclosed in the aforesaid application, and it will be evident that when both the vessels and ports 54 are sealed, the air will be withdrawn from the vessels, which will raise the liquid against gravity in the siphon conduit from the reservoir into the vessels, providing the vessels are leak-proof. Should a vessel have a fracture or hole, it will be refused, that is, it will not be filled, because air can flow into the vessel through the hole or crack and prevent the formation of a vacuum therein, and since this vacuum is essential to the filling of the vessel, it will remain empty.

Assuming that the vessels are perfect, and sealed, with the ports 54 also sealed, so that the air is exhausted, this will at once create a very strong suction at the outlet ends or stems 18 of the liquid conduit, and the pull on the liquid in said conduit will draw it into the vessels. Any foam present is also drawn out with the air.

The filling is continued until the operator observes that the liquid in each of the vessels has reached the level L of the lower ends of the air outlet stems 17. In other words, the withdrawal from the vessels is kept up until the liquid level in each of the vessels reaches the level of the lower ends of the passages 20, when the liquid will flow into said passages. As soon as the liquid enters the passages 20, it will immediately check the flow of liquid into and out of the vessels due to the great resistance to the flow of liquid in said restricted passages, and the result is two fold, because the overflow of the liquid from the vessels to the over flow receiver 14 is reduced to a minimum to prevent the too rapid filling of the receiver, and secondly, the flow of liquid into and out of the vessels being reduced thereby also reduces the agitation which would be present if the liquid flow continued undiminished.

The next step is to remove the filler heads from the vessels, or to separate the filler heads or vessels, and as soon as the pressure is relieved, the member 16 and gaskets 25 separate, as seen in Figure 4, thereby breaking the continuity of the liquid conduit for the reason that the ports 54 being opened will let in air. This admission of air into the liquid conduit will separate or divide the stream of liquid in each branch of the short leg of the siphon conduit, and as the filler heads and vessels are separated, the seals 25 are removed from the vessels thereby also letting the air flow into the vessels. In this way, as the filler heads and vessels are separated the ports 54 are first opened and the vessels then unsealed, and the continued air suction through the air conduit will take off any surplus liquid and foam, whereas the opening of the ports 54 in letting air into the liquid conduit at the upper ends of the stems 18, will permit the liquid in said stems to drop into the vessels, while the remaining liquid in the liquid conduit between the ports 54 and reservoir can siphon back to the reservoir. In other words, the liquid stream is divided or separated at the ports 54, and will flow in opposite directions in the liquid conduit from said ports, as indicated by the arrows in Figure 4, part flowing down the stems 18 into the vessels and the remainder siphoning back to the reservoir. Thus, the liquid which drops from the stems 18 into the vessels during the separation of the filler heads and vessels, will raise the level of the liquid in the vessels to the point L'. The level of filling is therefore determined by the distance that the air outlet stems 17 extend below the seals and the capacities of the liquid entry stems 18. The admission of air into the liquid conduit thus brings to a stop the flow of liquid into the vessel, thereby completing the filling of the vessel. The liquid which is between the air inlet port and vessel will flow into the vessel, while the liquid between said port and the liquid reservoir will siphon back into the reservoir to avoid overfilling. The liquid siphon has the air inlet port in its short leg near the highest point of the passage, so that the liquid will flow by gravity downwardly from the port into the vessel and downwardly by gravity in the longer leg of the siphon passage back into the reservoir, the column of liquid thus being divided. When the liquid column drops back into the reservoir it will by its inertia fall below the level of the liquid in the reservoir, causing a fluctuation until the levels in the reservoir and liquid passage coincide, but this will not disturb conditions within the vessel, because the air can pass in and out through the air port above the vessel without flowing through the vessel. The distrance X between the levels L and l is determined by the character of the liquid handled, to assure of the siphoning back of the liquid, but not with too great a force, so that the advance flow of the liquid will again be taken up quickly when the next vessels are sealed and the ports 54 closed. The emptying of the liquid stems 18 into the vessels will avoid dripping when changing from filled to unfilled vessels and this provides an efficient manner of terminating the process, for repeated filling.

Particular attention is directed to the fact that the port 54 provides for very accurate filling, because it offers effective means for admitting air into the vessels, so as to stop the flow of liquid thereinto, and so that the withdrawal can be continued to take out all surplus liquid above a given level. Thus, instead of withdrawing the filler heads from the vessels suddenly, as will prevent further withdrawal, and allow the liquid below the ports to further fill the vessels, the apparatus lends itself admirably to conditions when all liquid above a desired level in the vessels is to be taken out, by simply separating the filler heads and vessels slightly and leaving them thus for a short period until the surplus liquid is taken out (air being admitted by such slight separation) and then withdrawing the filler heads completely out of the vessels. To explain this point more fully, assume that the vessels are being filled, as above described, and the liquid level reaches the air outlet passages, then by relieving pressure on the filler heads, the members 16 and seals 25 will separate, but the seals still remain on the vessels. In this way, the filler heads will always be raised a given small distance above the vessels to assure accuracy, when pressure is relieved, and furthermore, air will therefore be let into the liquid conduit by way of the ports 54, thus stopping the liquid flow past said ports, and letting what liquid has already passed said ports flow into the vessels. The withdrawal from the vessels, however, is continued, and even though retarded by the restriction of the air eduction passages, the liquid above the level of the lower inlet ends of said passages will all be drawn out. Thus, by referring to Figure 4, supposing that the seal 25 is seated on the vessel, with pressure on the member 16 relieved, then said member will be raised a given small distance and also the stems, and the liquid above the then level of the lower end of the air outlet stem 17 will all be sucked out. This therefore accurately determines the level that all of the vessels are filled.

The method of filling is therefore modified by relieving pressure on the filler heads when the liquid enters the eduction passages, so as to slightly separate the filler heads and vessels and let in air, which will stop the flow of liquid into the vessels past the point of air admission and consequently permit the liquid above a fixed level to be withdrawn. After this has been done, then the filler heads and vessels can be completely separated for repeated operation on the next empty vessels.

The importance of this step in the method will be appreciated more fully, when it is explained that with many liquids, there is considerable rarefaction of the air in the vessels during filling, so that when the liquid level reaches the air eduction passages and its flow is checked, a partial vacuum still remains in the vessels above the then existing level, and as a result, this partial vacuum will continue the inflow of the liquid until the pressures are balanced. The liquid level will thus rise to a distance above the lower ends of the air eduction passages, and unless this is remedied, uneven filling is apt to result, due to the fact that the level of filling under these conditions will remain undetermined, and unless the surplus liquid is taken out with uniformity, irregular filling will result. With the aforesaid way of modifying the process, however, the surplus liquid will be taken out uniformly and the vessels filled up to an exact level.

Not only does the gasket form a seal for both the vessel and port 54, but it further provides, as just described, means for automatically raising the filler head a given distance when pressure is relieved, to thereby let in air and result in the taking out of any and all surplus liquid and foam. This result could be gained also by lifting the seal, as in Figure 4, but it would be difficult to regulate same.

*Hand filler head device.*

In Figures 5, 6 and 7 there is depicted a hand manipulated device for the filler heads 13, of which two are shown. The rear ends of the tubes 23 and 24 are secured to Y-couplings 60 to which the tubings or hose 25' and 26 are attached. The tubes are of bendable or flexible metal or equivalent material. A handle 61 is employed in said device for manipulating the filler heads, and is provided at its rear end with a depending strap or portion 62 carrying clamping means 63 for embracing the tubes 23 and 24 adjacent to their rear ends. This clamping means 63 comprises upper and lower clamps for the respective tubes 23 and 24, and each clamp has the upper and lower clamping plates 64 between which the respective tubes are clamped. The edges of the clamping plates are bent toward one another so as to hold the clamps and tubes in fixed position, and a spacer 65 is disposed between the two clamps, while clamping screws 66 extend through the upper and lower clamps and take into the spacer 65. These screws 66 when tightened clamp the tubes between the clamping plates 64 and also draw the clamps tightly against the spacer 65 to make the structure rigid. The uppermost clamping plate 64 can be integral with and form an angular extension of the strap 62 so as to connect the clamping means and handle. This clamping means tightly embraces and firmly holds the tubes 23 and 24, with the couplings 60 immediately behind the clamps and the tubes 23 and 24 diverging from the clamps to the filler heads 13.

The filler heads are carried by the forward end of the handle which has a depending strap or portion 67 having at its lower end, a T-head or cross piece 68. The opposite arms of the head or cross piece 68 have horizontal slots 69 containing clamping screws 70 that take into the members 16 in rear of the cross piece 68.

By loosening the screws 70, the filler heads can be adjusted individually so as to space them the desired distance, and the filler heads can thus be adjusted according to the spacing of the vessels. Furthermore, the adjustment permits the handle 61 to be in a vertical plane midway between the filler heads, so that the downward pressure of a hand grasping the handle, will be distributed evenly to both filler heads when they are applied to the vessels. The tubes 23 and 24 being bendable, permit the filler heads to be adjusted relatively, it being noted that said tubes are firmly clamped at a point spaced from the heads so as to be bendable between said point and heads.

This device is simple in construction and manufacture, and at the same time, enables the filler heads to be manipulated by hand in a most convenient and facile manner.

*Modification.*

Figure 8 illustrates a modification in the filler heads. The stems 17 and 18 are reversed, as well as the tubes 23 and 24. Thus, the air outlet stem 17 is on the inside, and the port 54 is therefore of slightly different arrangement than shown in Figures 3 and 4, so as to open into the liquid conduit between the stem 18 and tube 23.

This figure simply illustrates one of various ways of using the air entry port.

Having thus described the invention, what is claimed as new is:

1. A vessel filling apparatus including an air suction conduit to communicate with a vessel for withdrawing the air therefrom, a liquid conduit to communicate with the vessel leading from a supply of liquid and arranged so that the liquid has a tendency to flow reversely away from the vessel, and means for the admission of air from the atmosphere from the exterior of the vessel to break the suction on the liquid in the liquid conduit and permit the reverse flow of liquid in said liquid conduit away from the vessel.

2. A vessel filling apparatus including a seal for a vessel, means for withdrawing air through the seal from within the vessel, and a liquid conduit to communicate with the vessel leading from a source of liquid and arranged so that the liquid has a tendency to flow reversely in said liquid conduit away from the vessel, the apparatus having a port for the admission of air from the atmosphere from the outer side of the seal to break the suction on the liquid from said means and to permit the reverse flow of the liquid in the liquid conduit away from the vessel.

3. A vessel filling apparatus including a liquid conduit to communicate with a vessel leading from a source of liquid and arranged so that the liquid has a tendency to flow reversely away from the vessel in said conduit, said conduit having an air entry port between its ends to admit air and permit the liquid to flow away from said port, and means beyond said port for establishing the flow of liquid into the vessel.

4. A vessel filling apparatus including means for withdrawing the air from a vessel, a liquid conduit to communicate with the vessel leading from a source of liquid and arranged so that the liquid has a tendency to flow reversely in said conduit away from the vessel, said conduit having an air entry port between its ends adapted to be opened for admitting air into said conduit and permitting the liquid to flow away from said port.

5. A vessel filling apparatus including a seal for a vessel, means for withdrawing the air from the vessel through said seal, and a liquid conduit to communicate with the vessel leading from a source of liquid and arranged so that the liquid has a tendency to flow reversely away from the vessel in said conduit, said conduit having an air entry port leading from the outer side of the seal arranged for the admission of air into said conduit and permitting the flow of liquid away from said port.

6. A vessel filling apparatus including a seal for a vessel, means for withdrawing air through the seal from within the vessel, a liquid conduit to communicate with the vessel leading from a source of liquid and arranged so that the liquid has a tendency to flow reversely in said liquid conduit away from the vessel, the apparatus having a port for the admission of air from the atmosphere from the outer side of the seal to break the suction on the liquid from said means and to permit the reverse flow of the liquid in the liquid conduit away from the vessel, and means for sealing the vessel and said port.

7. A vessel filling apparatus including a member to be disposed over a vessel, an air suction conduit leading through said member to withdraw the air from the vessel, a liquid supply conduit leading through said member from a source of liquid and arranged so that the liquid has a tendency to flow reversely away from the vessel, said member having an air entry port for the admission of air from the exterior of the vessel to break the suction on the liquid in the liquid conduit, and a seal associated with said member for sealing the vessel and also sealing said port.

8. A vessel filling apparatus including a seal for a vessel, means for withdrawing air through the seal from within the vessel, a liquid conduit to communicate with the vessel leading from a source of liquid and arranged so that the liquid has a tendency to flow reversely in said liquid conduit away from the vessel, the apparatus having a port for the admission of air from the atmosphere from the outer side of the seal to break the suction on the liquid from said means and to permit the reverse flow of the liquid in the liquid conduit away from the vessel, and means for sealing the vassel and said port and operable by the separation of said vessel and conduit to first unseal said port before unsealing the vessel.

9. A vessel filling apparatus including a seal for a vessel, means for withdrawing air through the seal from within the vessel, a liquid conduit to communicate with the vessel leading from a source of liquid and arranged so that the liquid has a tendency to flow reversely in said liquid conduit away from the vessel, the apparatus having a port for the admission of air from the atmosphere from the outer side of the seal to break the suction on the liquid from said means and to permit the reverse flow of the liquid in the liquid conduit away from the vessel, and a single seal for sealing the vessel and also said port by the bringing together of the vessel and conduit and arranged to unseal said port before unsealing the vessel when the conduit and vessel are separated.

10. A vessel filling apparatus including a member to be disposed over the mouth of a vessel, an air suction conduit leading through said member, a liquid conduit leading through said member from a source of liquid and arranged so that the liquid has a tendency to flow reversely away from the vessel, said member having an air entry port for the admission of air to break the suction of the liquid in the liquid conduit, and a seal assembled with said member for sealing the vessel and said port when said member and vessel are brought together under pressure, said seal being operable when the pressure is relieved for slightly separating said member and vessel to open said port.

11. A vessel filling apparatus including an air conduit for withdrawing the air from a vessel at a desired filling level, a liquid conduit leading from a source of liquid to communicate with the vessel and arranged so that the liquid has a tendency to flow reversely away from the vessel, and means for sealing the vessel under pressure between said vessel and conduits and operable for separating said vessel and conduits when the pressure is relieved, said means being arranged to admit air by the separation of the vessel and conduits while said means is still bearing on the vessel in sealing position.

12. A vessel filling apparatus including a member to be disposed over the mouth of a vessel, an air suction conduit leading through said member for withdrawing the air from the vessel at a desired filling level therein, a liquid conduit leading through said member from a source of liquid and arranged so that the liquid has a tendency to flow reversely away from the vessel, and means associated with said member to be brought under tension when said member and vessel are pressed together and arranged to separate the vessel and member a predetermined amount when the pressure is removed with said means still in position against the vessel, said means being arranged for the admission of air from the atmosphere when it has separated the vessel and member to break the air suction on the liquid in the liquid conduit and permit the liquid in the vessel above said level to be withdrawn.

13. A vessel filling apparatus including a member to be disposed over a mouth of a vessel, an air suction conduit leading through said member for withdrawing the air from the vessel at a desired filling level therein, a liquid conduit leading through said member from a source of liquid and arranged so that the liquid has a tendency to flow reversely away from the vessel, and a seal associated with said member for sealing the vessel when said member and vessel are pressed together and adapted to be brought under tension to separate the member and vessel when the pressure is relieved with said seal still bearing on the vessel in sealing position, the apparatus having a port leading from the outer side of said seal and so arranged as to admit air when the seal separates the vessel and member for breaking the air suction on the liquid in the liquid conduit and permitting the liquid in the vessel above said level to be withdrawn.

14. A vessel filling apparatus embodying a handle, filler heads carried by one end of said handle for relative adjustment, a set of clamping plates, flexible tubes diverging apart and connected to said heads, the adjacent end portions of said tubes extending between said plates, said plates being formed to fit said tubes, and means securing said plates to the other end of the handle and clamping the tubes between said plates.

15. A vessel filling apparatus including a handle, filler heads carried by the handle for relative adjustment, clamping means carried by the handle, and flexible tubes having adjacent portions embraced by said clamping means, said tubes diverging apart from said clamping means and being connected to said filler heads, and said clamping means being formed to fit and surround said tubes.

In testimony whereof, I hereunto set my hand this 27th day of May, 1918.

FRED. L. SHELOR.